Aug. 21, 1928.

G. H. KNIGHT 1,681,412

ADJUSTABLE MACHINE TABLE SUPPORT

Filed May 18, 1927

Inventor
George H. Knight
By Attorneys
Southgate Fay & Starky

Patented Aug. 21, 1928.

1,681,412

UNITED STATES PATENT OFFICE.

GEORGE H. KNIGHT, OF TORRINGTON, CONNECTICUT, ASSIGNOR TO THE HENDEY MACHINE COMPANY, OF TORRINGTON, CONNECTICUT, A CORPORATION OF CONNECTICUT.

ADJUSTABLE MACHINE-TABLE SUPPORT.

Application filed May 18, 1927. Serial No. 192,454.

This invention relates to an adjustable support particularly adapted for holding a shaper table.

The principal object of the invention is to provide a support cooperating with the table in such a way that the table can be raised or lowered easily and adjusted to substantially the desired position and then the supporting means can be forced up a small distance for the fine adjustment and the weight of the table will be carried by a part of the support which is rigid; and to provide a positive support with no possibility of slipping when the work is heavy or when there is vibration.

Other objects and advantages of the invention will appear hereinafter.

Reference is to be had to the accompanying drawings in which

Figure 1:
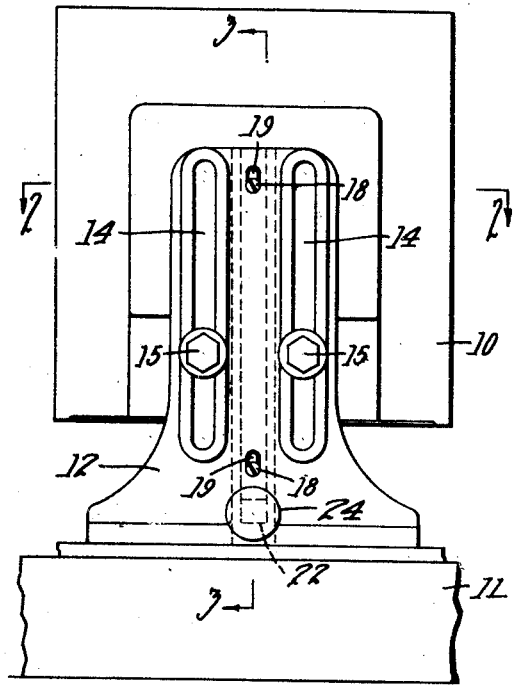
Fig. 1 is an elevation of an adjustable support taken at the end of the machine.
Figure 2:
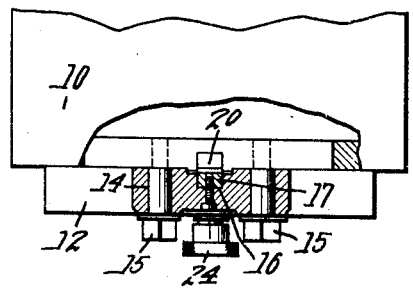
Fig. 2 is a horizontal sectional view on the line 2—2 of Fig. 1.
Figure 4:
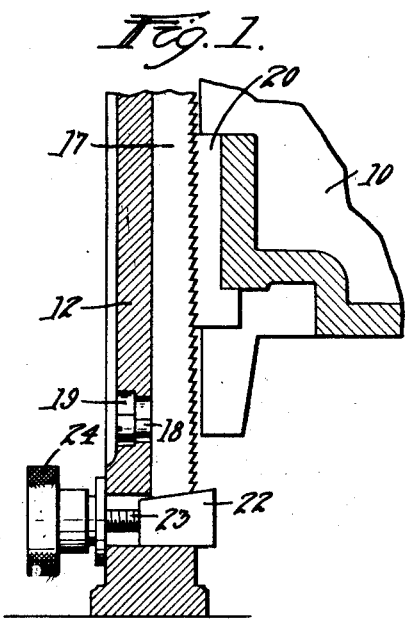
Fig. 4 is an enlarged view of the supporting rack and adjusting means.

The invention is capable of general use but I show it as supporting a shaper table 10 at one end. The support is mounted on an extended portion of the base 11 of the machine. A table support casting 12 is carried by the base 11, located under the end. This support is provided with two vertical slots 14 and bolts 15 extend through these slots into the table. The obvious adjustment is to loosen these bolts and move the table up and down, the bolts moving in the slots.

This casting 12 also has a longitudinal slot 16 in the back into which fits a steel rack 17. This rack has teeth all along it in the form of saw teeth having horizontal upper edges and slanting lower edges. The rack is held in place by two screws 18 located in oblong slots 19 which allow for vertical motion of the rack greater than the spacing of the teeth for adjusting purposes. The table 10 is provided with a mating rack section 20 having saw teeth arranged in the opposite direction. This is fixed positively in the table.

Figure 3:
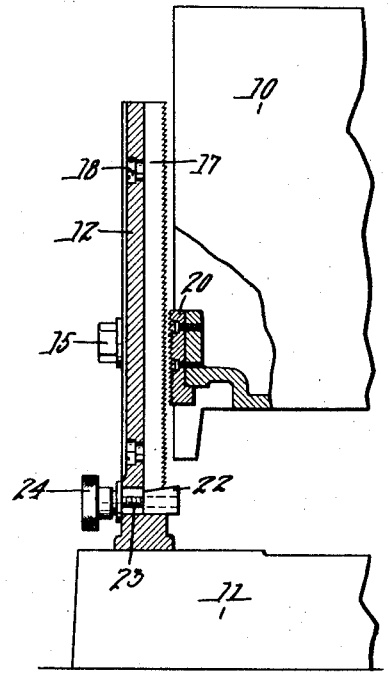
Fig. 3 is a vertical sectional view on the line 3—3 of Fig. 1.

The table therefore can be moved up when the racks are disconnected as shown in Fig. 3 and then the supports at the ends moved to connect the racks and hold the table. Obviously the racks might not exactly match. As stated the rack 17 is capable of a slight motion up and down and while being fitted it is loose so that it can move as desired. At the bottom of the rack is located a wedge 22. This is entered by a screw 23 having a head 24. This screw can be tightened up to pull in the wedge and lift the rack which has a surface, preferably of the same slant as the wedge.

In the operation of the device, the bolts 15 are loosened until the rack teeth can be disengaged. The table is then raised or lowered to the desired position and the bolts 15 drawn up slightly. The wedge, which when adjusting is kept out in a position to let the rack 17 down, is now pulled in by the screw 23. This puts a tension on the rack and takes the weight of the table on the wedge and the table support 12. The bolts 15 are then tightened up securely.

This provides a positive support with no possibility of its slipping under the heads of the binder bolts 15. This is a difficulty that happens with the ordinary table support when the work is heavy and when there is vibration.

Although I have illustrated and described only one form of the invention I am aware of the fact that modifications can be made therein by any person skilled in the art without departing from the scope of the invention as expressed in the claims. Therefore, I do not wish to be limited to the details of construction herein disclosed, but what I do claim is:

1. The combination with a table adjustable for height and having a sidewise motion, of an extended portion of the base of the machine having a horizontal top surface, a table support on said horizontal surface having a slot, a rack on the table, a rack in the slot in the table support the teeth of which match the teeth of the first named rack, and engage the teeth of the first named rack, means for adjusting the second rack vertically, and means for positively holding the bottom of the last named rack to give a non-slipping support to the table.

2. The combination with a table having a rack section fixed thereon and a support therefor consisting of an upright having a vertical slot, a bolt in the slot for fastening the table to the upright, a rack arranged vertically on the support adapted to fit said rack section, and means for forcing the rack on the support upwardly to cause the teeth to match and provide a positive support.

3. The combination with a table for a machine tool having a rack section fixed thereon and provided with teeth having substantially horizontal lower edges and a support therefor consisting of an upright having a vertical slot, a bolt in the slot for fastening the table to the upright, a rack arranged vertically on the support and having teeth with their upper surfaces substantially horizontal adapted to fit said rack section, and means for forcing the rack on the support upwardly to cause the teeth to match and provide a positive support.

4. In a support for the table of a shaper, the combination with a supporting member having a rack arranged vertically and movable slightly in a vertical direction and an opposite rack member on the table engaging said rack, of a wedge at the bottom of the rack, and a screw for moving the wedge horizontally to raise the first named rack to cause the teeth to fit and provide a positive support.

In testimony whereof I have hereunto affixed my signature.

GEORGE H. KNIGHT.